US012787012B2

(12) United States Patent
Lee et al.

(10) Patent No.: US 12,787,012 B2
(45) Date of Patent: *Nov. 3, 2026

(54) DEVICE OF HANDLING DETECTION OF A PDCCH

(71) Applicant: ACER INCORPORATED, New Taipei City (TW)

(72) Inventors: Chien-Min Lee, New Taipei City (TW); Jen-Hsien Chen, New Taipei City (TW); Li-Chung Lo, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 596 days.

This patent is subject to a terminal disclaimer.

(21) Appl. No.: 17/567,170

(22) Filed: Jan. 3, 2022

(65) Prior Publication Data

US 2022/0225300 A1 Jul. 14, 2022

Related U.S. Application Data

(60) Provisional application No. 63/136,656, filed on Jan. 13, 2021.

(51) Int. Cl.

*H04W 72/23* (2023.01)
*H04L 1/1812* (2023.01)
*H04W 72/232* (2023.01)

(52) U.S. Cl.

CPC ........... *H04W 72/23* (2023.01); *H04L 1/1812* (2013.01); *H04W 72/232* (2023.01)

(58) Field of Classification Search

CPC .... H04W 72/23; H04W 72/232; H04L 1/1812

(Continued)

(56) References Cited

U.S. PATENT DOCUMENTS 10,880,949 B2 * 12/2020 Zhou ..................... H04L 5/0098
11,219,013 B2 * 1/2022 Kim ...................... H04W 16/14

(Continued)

FOREIGN PATENT DOCUMENTS

KR 10-2020-0088305 7/2020
KR 10-2020-0140745 A 12/2020

(Continued)

OTHER PUBLICATIONS

Moderator (Lenovo), Summary of Email discussion [102-e-NR-unlic-NRU-DL_Signals_and_Channels-02] on Search Space and CSI-RS, 3GPP TSG RAN WG1#102-e, e-Meeting, Aug. 17-28, 2020, R1-2007144 Aug. 2020.

(Continued)

*Primary Examiner* — Jasper Kwoh
(74) *Attorney, Agent, or Firm* — Winston Hsu

(57) ABSTRACT

A communication device for handling a physical downlink (DL) control channel (PDCCH) reception comprises at least one storage device; and at least one processing circuit, coupled to the at least one storage device. The at least one storage device stores instructions, and the at least one processing circuit is configured to execute the instructions of changing from a first active bandwidth part (BWP) of a serving cell of a network to a second active BWP of the serving cell according to at least one first indicator; and determining whether to detect a PDCCH according to at least one search space (SS) set for the serving cell, after changing to the second active BWP.

14 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0281594 | A1 | 9/2019 | Aiba | |
| 2019/0357215 | A1 | 11/2019 | Zhou | |
| 2019/0357300 | A1* | 11/2019 | Zhou | H04L 5/0094 |
| 2020/0067676 | A1 | 2/2020 | Yi | |
| 2020/0084705 | A1* | 3/2020 | Xu | H04W 72/53 |
| 2020/0229092 | A1 | 7/2020 | Wu | |
| 2020/0314671 | A1 | 10/2020 | He | |
| 2020/0314898 | A1 | 10/2020 | Sun | |
| 2020/0322116 | A1 | 10/2020 | Zhou | |
| 2020/0351847 | A1* | 11/2020 | Kim | H04W 72/0446 |
| 2020/0367253 | A1 | 11/2020 | Kim | |
| 2020/0389874 | A1* | 12/2020 | Lin | H04L 5/0096 |
| 2021/0014008 | A1* | 1/2021 | Takeda | H04L 1/0001 |
| 2023/0179342 | A1* | 6/2023 | Zhang | H04L 1/1854 370/329 |
| 2023/0276459 | A1* | 8/2023 | Ouchi | H04L 1/1854 370/329 |

FOREIGN PATENT DOCUMENTS

| | | | |
|---|---|---|---|
| WO | 2020/198356 | A1 | 10/2020 |
| WO | 2020/246858 | A1 | 12/2020 |
| WO | 2020/254477 | A1 | 12/2020 |

OTHER PUBLICATIONS

Moderator (Lenovo), Summary of email discussion [100b-e-NR-unlic-NRU-DL_Signals_and_Channels-01] on SS group sets, 3GPP TSG RAN WG1#100bis-e e-Meeting, Apr. 20-30, 2020, R1-2002786, XP051879486.

Moderator (Lenovo), Summary of email discussion [101-e-NR-unlic-NRU-DL_Signals_and_Channels-01] on Search Space, 3GPP TSG RAN WG1#101-e e-Meeting, May 25-Jun. 5, 2020, R1-2004851, XP051892296.

Moderator (Lenovo), Summary#2 of Email discussion [102-e-NR-unlic-NRU-DL_Signals_and_Channels-02] on Search Space and CSI-RS, 3GPP TSG RAN WG1#102-e, e-Meeting, Aug. 17-28, 2020, R1-2007258, Aug. 2020.

Moderator (Lenovo), Feature lead summary for NR-U DL Signals and Channels, 3GPP TSG RAN WG1#102-e, e-Meeting, Aug. 17-28, 2020, R1-2006875, Aug. 2020.

Moderator (Lenovo), Draft TP on search space set group switching, 3GPP TSG RAN WG1#100bis-e e-Meeting, Apr. 20-30, 2020, R1-2003042, XP051879591 ,Apr. 20, 2022.

Media Tek Inc, Summary of Bandwidth Part Remaining Issues, 3GPP TSG RAN WG1 Meeting #94bis, R1-1811955, Chengdu, China, Oct. 8-Oct. 12, 2018 ,Oct. 8, 2018.

Vivo, Discussion on DCI-based power saving adaptation in connected mode, 3GPP TSG RAN WG1#103-e, R1-2007676, e-Meeting, Oct. 26-Nov. 13, 2020 ,Oct. 26, 2020.

Oppo, Remaining issues on scheduling and HARQ, 3GPP TSG RAN WG1 #103-e, R1-2008277, e-Meeting, Oct. 26-Nov. 13, 2020, Oct. 26, 2020.

* cited by examiner

DEVICE OF HANDLING DETECTION OF A PDCCH

CROSS REFERENCE TO RELATED APPLICATIONS

This application claims the benefit of U.S. Provisional Application No. 63/136,656 filed on Jan. 13, 2021, which is incorporated herein by reference.

BACKGROUND OF THE INVENTION

1. Field of the Invention

The present invention relates to a device used in a wireless communication system, and more particularly, to a device of handling detection of a physical downlink control channel (PDCCH).

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

A LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

Power consumption has been an important issue for a user equipment (UE). Various aspects of the UE has been discussed to reduce the power consumption of the UE, to extend standby/use time of the UE. Different from the proposals in the prior art, detection of a physical downlink (DL) control channel (PDCCH) is improved in the present invention to reduce the power consumption of the UE.

SUMMARY OF THE INVENTION

The present invention therefore provides a device for handling detection of a physical downlink (DL) control channel (PDCCH) to solve the abovementioned problem.

A communication device for handling a physical downlink (DL) control channel (PDCCH) reception comprises at least one storage device; and at least one processing circuit, coupled to the at least one storage device. The at least one storage device stores instructions, and the at least one processing circuit is configured to execute the instructions of changing from a first active bandwidth part (BWP) of a serving cell of a network to a second active BWP of the serving cell according to at least one first indicator; and determining whether to detect a PDCCH according to at least one search space (SS) set for the serving cell, after changing to the second active BWP.

A communication device for handling a physical downlink (DL) control channel (PDCCH) reception comprises at least one storage device; and at least one processing circuit, coupled to the at least one storage device. The at least one storage device stores instructions, and the at least one processing circuit is configured to execute the instructions of performing an uplink (UL) transmission with a serving cell of a network; and detecting a PDCCH for the serving cell according to at least one search space (SS) set, after performing the UL transmission.

A communication device for handling a physical downlink (DL) control channel (PDCCH) reception comprises at least one storage device; and at least one processing circuit, coupled to the at least one storage device. The at least one storage device stores instructions, and the at least one processing circuit is configured to execute the instructions of receiving at least one first indicator from a first serving cell of a network, wherein the at least one first indicator indicates an activation of a second serving cell of the network; and detecting a PDCCH for the second serving cell according to at least one first search space (SS) set with a first group index.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
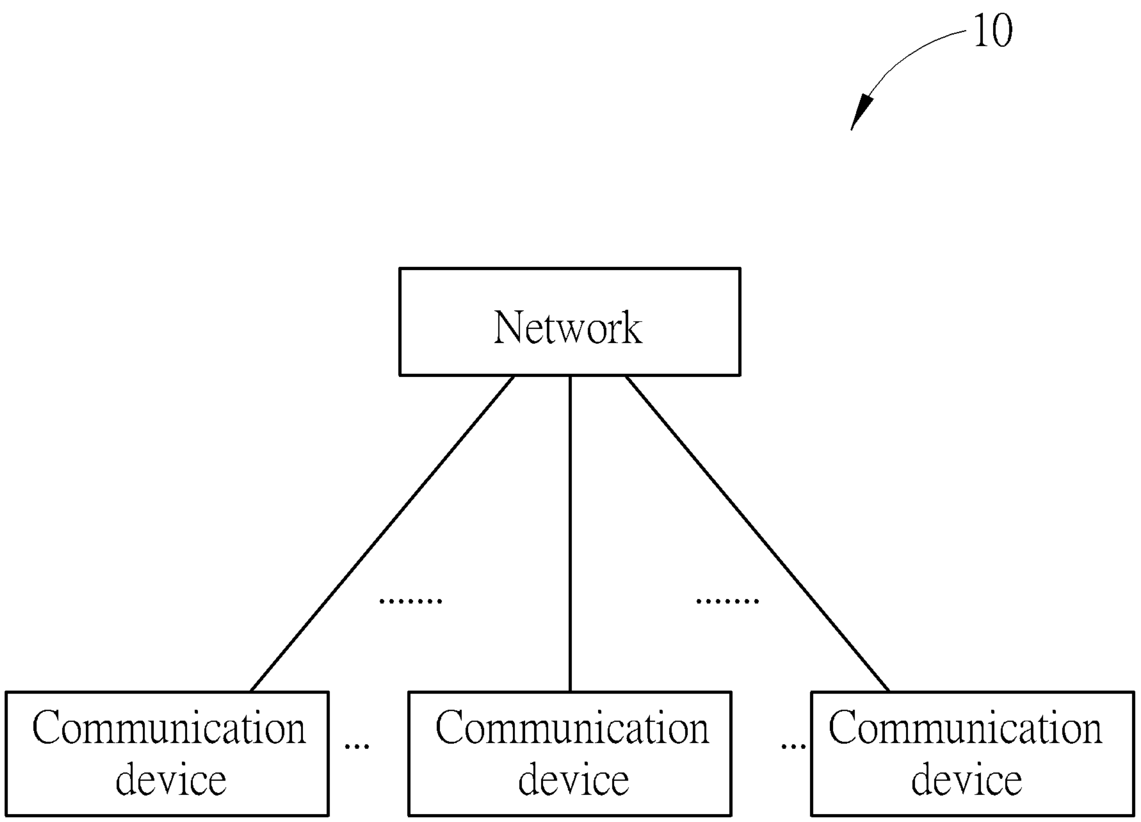
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). In one example, the network may be any BS conforming to a specific communication standard to communicate with a communication device.

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
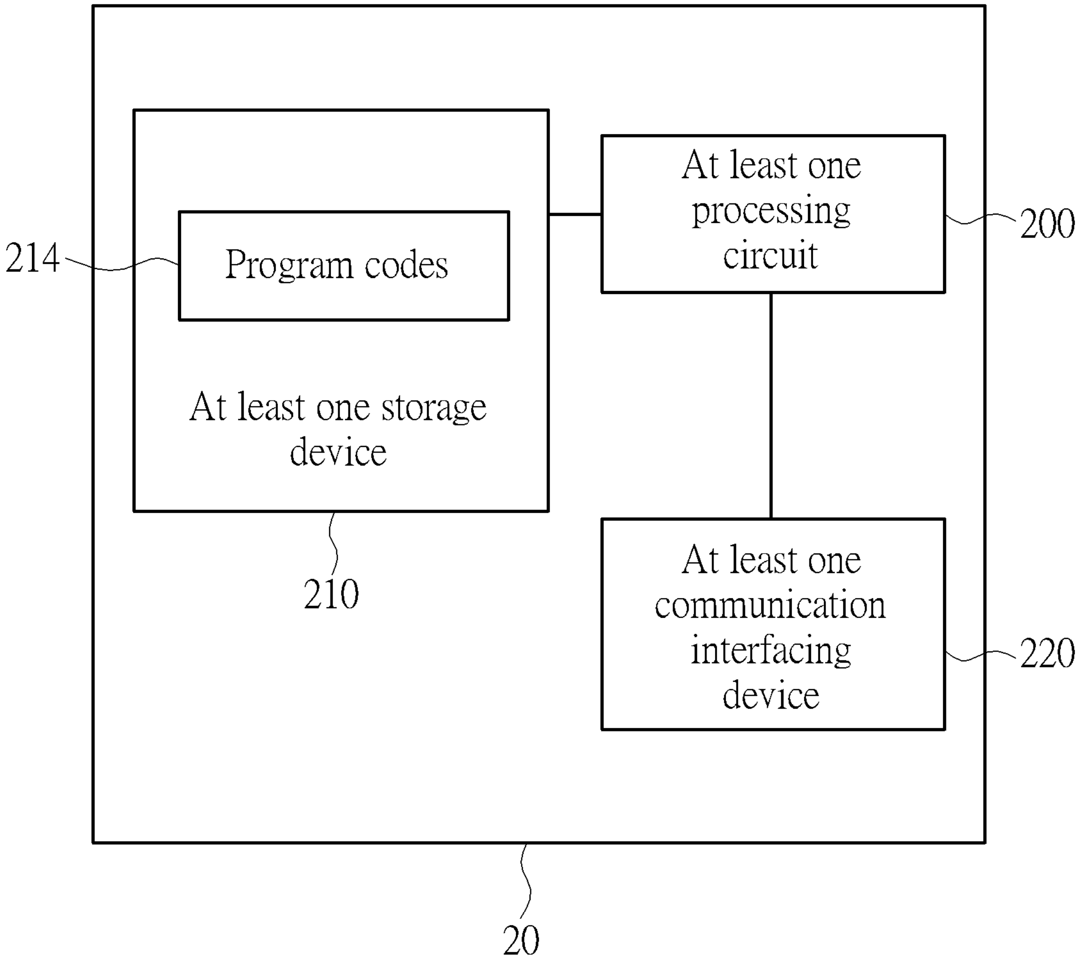
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
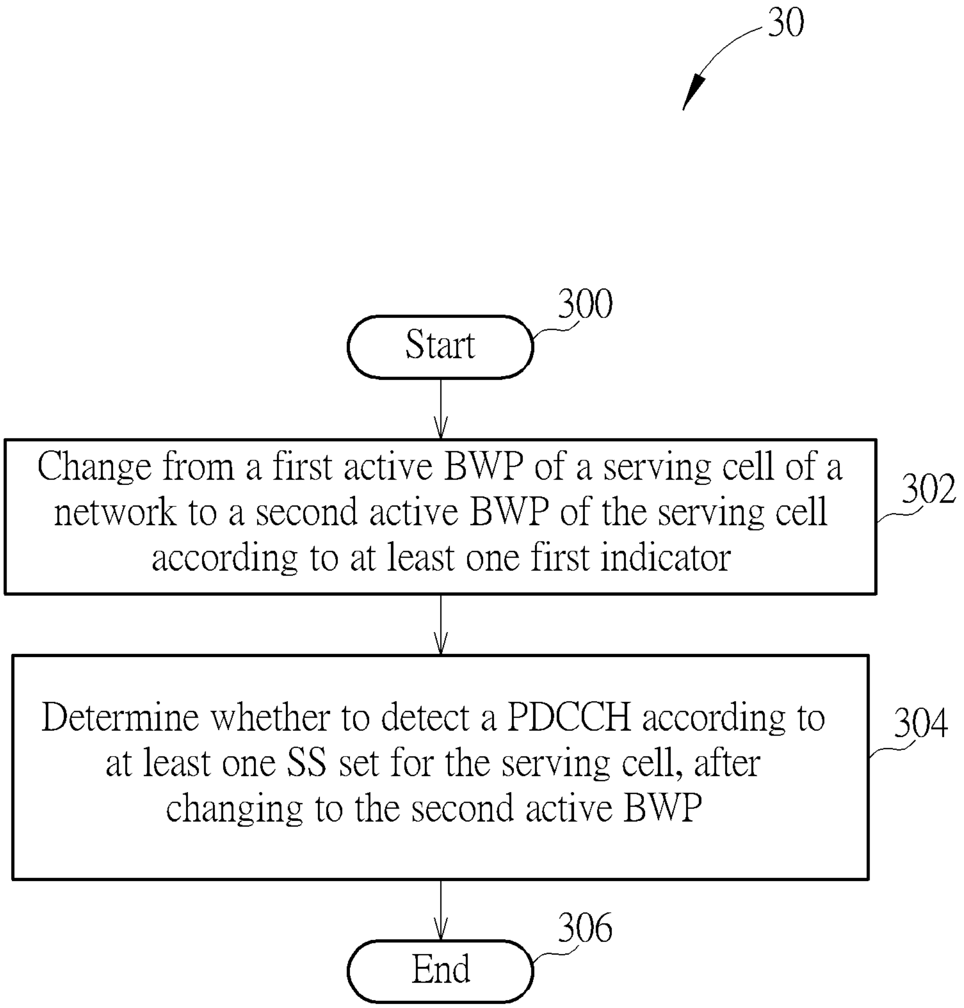
FIG. 3 is a flowchart of a process according to an example of the present invention.

FIG. 3 is a flowchart of a process 30 according to an example of the present invention. The process 30 may be utilized in a communication device, to handle detection of a physical DL control channel (PDCCH). The process 30 may be compiled into the program codes 214 and includes the following steps:

Step 300: Start.

Step 302: Change from a first active bandwidth part (BWP) of a serving cell of a network to a second active BWP of the serving cell according to at least one first indicator.

Step 304: Determine whether to detect a PDCCH according to at least one search space (SS) set for the serving cell, after changing to the second active BWP.

Step 306: End.

According to the process 30, the communication device changes (e.g., switches) from a first active BWP of a serving cell of a network to a second active BWP of the serving cell according to (e.g., via) at least one first indicator. Then, the communication device determines whether to detect (e.g., monitor, receive) a PDCCH according to at least one SS set for the serving cell, after changing to the second active BWP. That is, the BWP switching triggers the communication device to determine whether to detect the PDCCH according to the at least one SS set. Thus, the change of the BWP and the adaptation of the PDCCH detection (i.e., the PDDCH monitoring adaption) can be simultaneously operated in the serving cell.

Realization of the process 30 is not limited to the above description. The following examples may be applied for realizing the process 30.

In one example, the at least one first indicator is generated according to an expiration of a timer (e.g., BWP-inactivity timer) of the communication device.

In one example, the at least one first indicator is received in a DL control information (DCI) from the network. In one example, the DCI comprises at least one second indicator, and the communication device detects the PDCCH for the serving cell according to one of the following instructions: detecting the PDCCH for the serving cell according to the at least one SS set with a group index according to the at least one second indicator; and stopping detecting the PDCCH for the serving cell according to the at least one SS set for a time period according to the at least one second indicator.

In one example, the instruction of stopping detecting the PDCCH for the serving cell according to the at least one SS set for the time period according to the at least one second indicator comprises: detecting the PDCCH for the serving cell according to the at least one SS set for the time period according to the at least one second indicator if the at least one SS set comprises a predetermined SS set, and stopping detecting the PDCCH for the serving cell according to the at least one SS set for the time period according to the at least one second indicator if the at least one SS set is not the predetermined SS set. In one example, the predetermined SS set may include a common search space (CSS) set.

In one example, a PDCCH monitoring adaption of the second active BWP is enabled or performed (e.g., when the DCI comprises the at least one second indicator). In one example, the communication device ignores the at least one second indicator, if a PDCCH monitoring adaption of the second active BWP is disabled or not performed (e.g., even if the DCI comprises the at least one second indicator).

In one example, the communication device detects the PDCCH for the serving cell according to the at least one SS set, if the at least one SS set is configured with a group index indicated before changing to the second active BWP.

In one example, the communication device detects the PDCCH for the serving cell according to the at least one SS set, if the at least one SS set is configured with a group index and the group index is for detecting the PDCCH in the second active BWP.

In one example, the communication device detects the PDCCH for the serving cell according to the at least one SS set, if the at least one SS set is configured with a group index and a value of the group index is a predetermined value.

In one example, the second active BWP is a default BWP. In one example, the first active BWP is a dormant BWP, and the second active BWP is a first non-dormant BWP.

In one example, the at least one first indicator comprises a minimum applicable scheduling offset indicator indicated in a DCI from the network. In one example, the communication device detects the PDCCH according to the at least one SS set for the serving cell, if the at least one SS set is configured with a group index and a value of the group index is equal to a value of the minimum applicable scheduling offset indicator.

In one example, the at least one set is configured with at least one identity (e.g., respectively). In one example, at least one value of the at least one identity is between 0 and 39 (i.e., the value=0, . . . , 38 or 39). In one example, the at least one SS set is configured with a group index (e.g., 0 or 1).

It should be noted that a BWP is may be a contiguous set of physical resource blocks, selected from a contiguous subset of resource blocks for a given numerology (e.g., subcarrier spacing) on a serving cell. For a communication device, up to 4 BWPs may be specified in DL and/or UL of the serving cell. In addition, one BWP may be activated in a time period on the serving cell, and BWP changing may be performed according to an indication (e.g., in a DCI) transmitted by the network (e.g., gNB) or due to a timer expiration.

Figure 4:
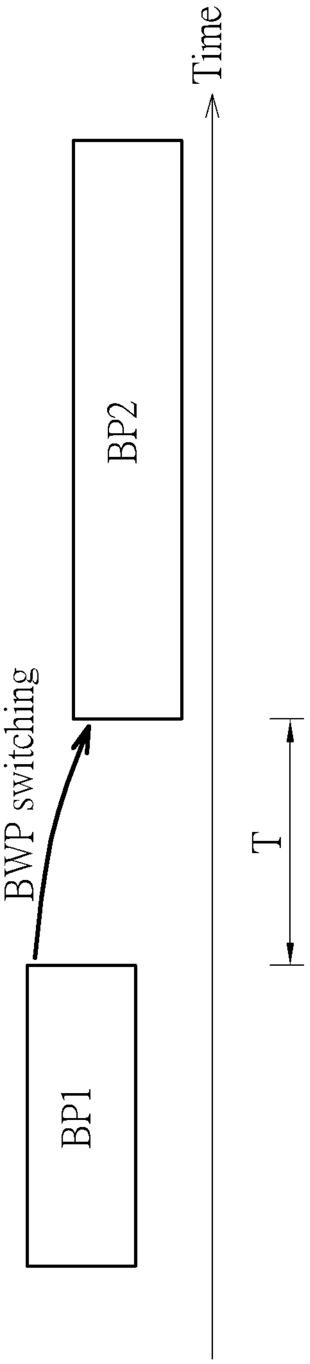
FIG. 4 is a schematic diagram of changing of a BWP according to an example of the present invention.

FIG. 4 is a schematic diagram of changing of a BWP according to an example of the present invention. For a serving cell, the communication device may be configured with multiple (e.g., up to four) BPWs, e.g., BWPs BP1 and BP2. The communication device changes (e.g., switches) from the BWP BP1 to the BWP BP2 (e.g., after a time period T) according to a DCI from the network or according to an expiration of a timer (e.g., BWP-inactivity timer).

In one example, the communication device may determine a group index after switching to the BWP BP2 according to at least one of the BWPs BP1 and BP2. The group index may be a predetermined value (e.g., 0), if the BWP BP2 is a default BWP. The group index may be a predetermined value (e.g., 1), if the communication device switches to the BWP BP2 according to an indication in a DCI from the network. The group index may be a predetermined value (e.g., 1), if the BWP BP1 is a dormant BWP and the BWP BP2 is a first non-dormant BWP. Thus, the communication device may determine to detect the PDCCH for the serving cell according to at least one SS set, if the at least one SS set is configured with the group index.

In one example, the communication device may determine a group index according to a minimum applicable scheduling offset (e.g., current state of) indicated by the network (e.g., via a DCI and/or a RRC signal). The group index may be a predetermined value (e.g., 1), if the minimum applicable scheduling offset is a value (e.g., 1) before switching to the BWP BP2. The group index may be a predetermined value (e.g., 0), if the minimum applicable scheduling offset is a value (e.g., 0) that may be applied after switching to the BWP BP2. Thus, the communication device may determine to detect the PDCCH for the serving cell according to at least one SS set, if the at least one SS set is configured with the group index.

Figure 5:
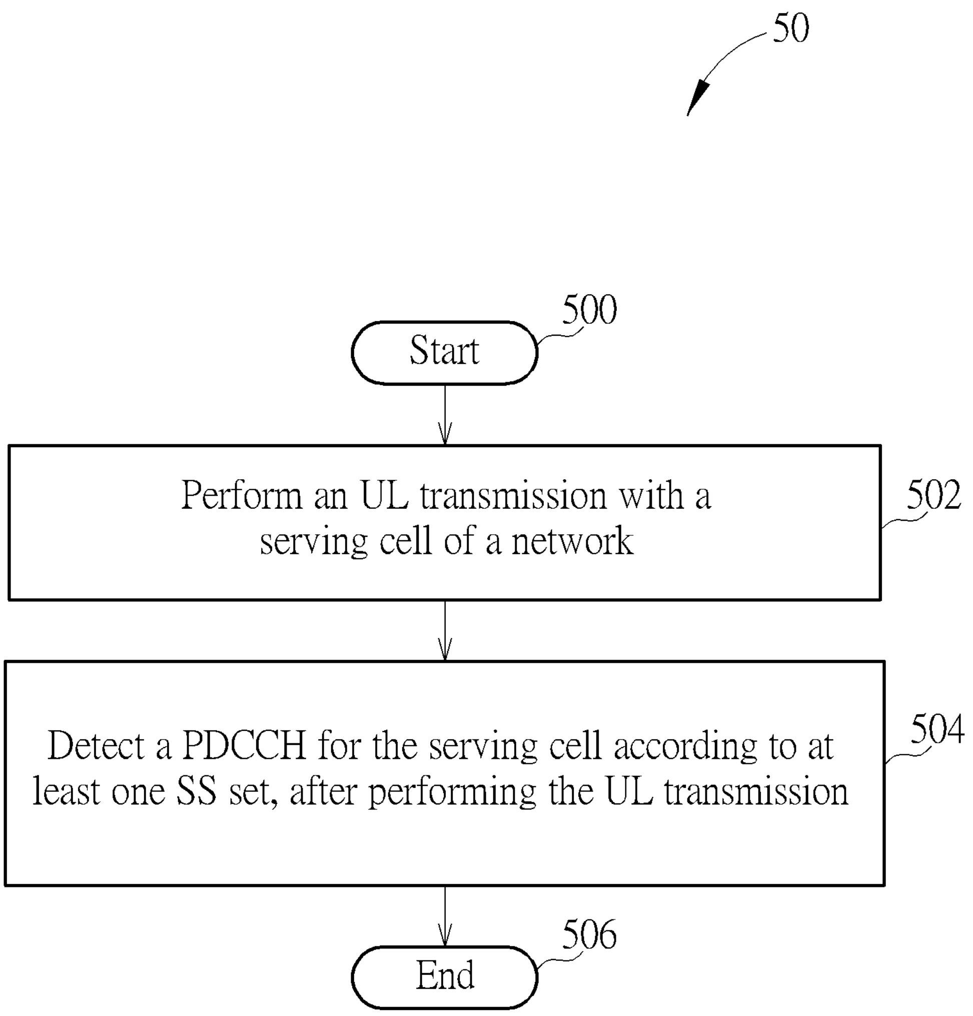
FIG. 5 is a flowchart of a process according to an example of the present invention.

FIG. 5 is a flowchart of a process 50 according to an example of the present invention. The process 50 may be utilized in a communication device, to handle detection of a PDCCH. The process 50 may be compiled into the program codes 214 and includes the following steps:

Step 500: Start.

Step 502: Perform an UL transmission with a serving cell of a network.

Step 504: Detect a PDCCH for the serving cell according to at least one SS set, after performing the UL transmission.

Step 506: End.

According to the process 50, the communication device performs an UL transmission with a serving cell of a network. Then, the communication device detects a PDCCH for the serving cell according to at least one SS set, after performing the UL transmission. That is, the UL transmission triggers the communication device to detect the PDCCH. Thus, the problem of the PDCCH detection triggered by the UL transmission is solved.

Realization of the process 50 is not limited to the above description. The following examples may be applied for realizing the process 50.

In one example, before performing the UL transmission, the communication device performs the instructions of receiving at least one indicator in a DL control information (DCI) from the network, and stopping detecting the PDCCH for the serving cell according to the at least one SS set according to the at least one indicator. In one example, the communication device detects the PDCCH for the serving cell according to one of the following instructions: detecting the PDCCH for the serving cell according to the at least one SS set with a group index according to the at least one indicator, and stopping detecting the PDCCH for the serving cell according to the at least one SS set for a time period according to the at least one indicator. In one example, the instruction of stopping detecting the PDCCH for the serving cell according to the at least one SS set for the time period according to the at least one indicator comprises: detecting the PDCCH for the serving cell according to the at least one SS set for the time period according to the at least one indicator if the at least one SS set is a predetermined SS set, and stopping detecting the PDCCH for the serving cell according to the at least one SS set for the time period according to the at least one indicator if the at least one SS set is not the predetermined SS set. The predetermined SS set may include a CSS set.

In one example, the UL transmission comprises a scheduling request (SR) or a physical random access channel (PRACH).

In one example, the UL transmission comprises a hybrid automatic repeat request (HARQ) feedback. In one example, the HARQ feedback is a negative acknowledgement (NACK). In one example, the HARQ feedback is corresponding to a priority index. In one example, a value of the priority index is 1.

In one example, the UL transmission comprises a physical uplink shared channel (PUSCH), and the PUSCH is corresponding to a priority index. In one example, a value of the priority index is 1.

In one example, the at least one SS set is configured with at least one identity. In one example, at least one value of the identity is between 0 and 39 (i.e., the value=0, . . . , 38 or 39). In one example, the at least one SS set is configured with a group index (e.g., 0 or 1).

In one example, after receiving the PDCCH, the communication device determines whether to detect a second PDCCH for the serving cell according to at least one second SS set according to at least one indicator in a DCI.

Figure 6:
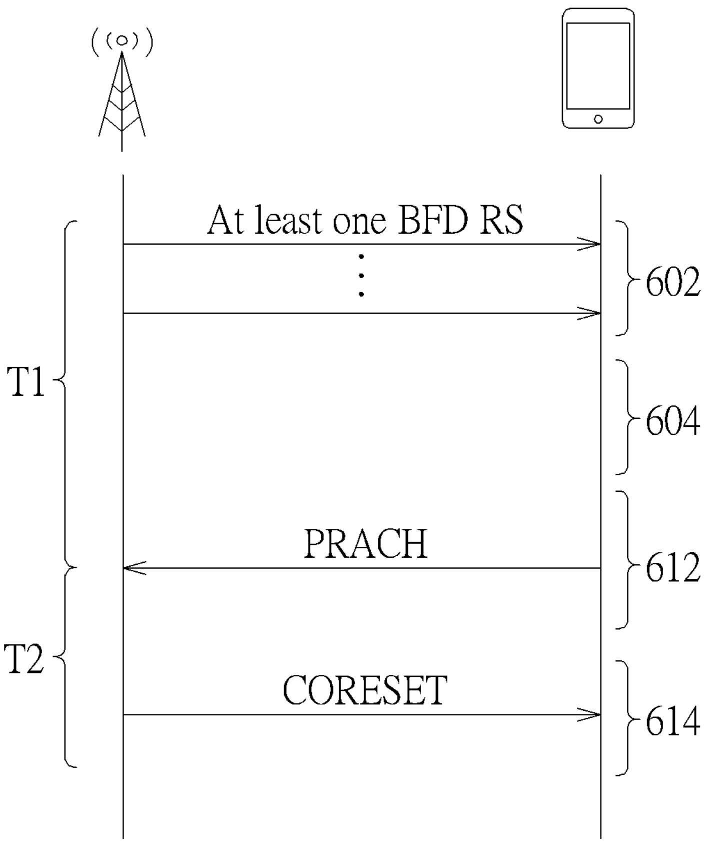
FIG. 6 is a flowchart of a process according to an example of the present invention.

FIG. 6 is a flowchart of a process according to an example of the present invention. In a time period T1, the communication device may detect a first PDCCH according to a first SS set with a first group index (e.g., 0) or may not detect the first PDCCH according to the first SS set. In Step 602, the network transmits at least one beam failure detection (BFD) reference signal (RS) to the communication device. The communication device performs a beam (or radio link) monitoring according to the at least one BFD RS, after receiving the at least one BFD RS. In Step 604, the communication device declares a beam failure according to a result of the beam monitoring (e.g., a link quality between the communication device and the network is lower than a threshold), and determines to find a new beam to trigger a link recovery procedure.

In Step 612, the communication device identifies a PRACH resource according to the new beam, and transmits a PRACH via the PRACH resource to the network for the link recovery procedure. After transmitting the PRACH (e.g., in a time period T2), the communication device may detect a second PDCCH according to a second SS set with a second group index (e.g., 1), or the communication device may detect the second PDCCH according to the second SS set even if the communication device is indicated not to detect the second PDCCH according to the second SS set. In Step 614, the communication device receives the second PDCCH according to the second SS set regularly. After the second PDCCH is received, the communication device may determine whether to receive a third PDCCH according to a third SS set according to at least one indicator e.g., in the second PDCCH or in a fourth PDCCH after the second PDCCH. In one example, after a timer expiration, the communication device may determine whether to receive a third PDCCH according to a third SS set, e.g., according to the second PDCCH.

In summary, in order to receive a response from the network quickly, the communication device may perform a SS set group switch/change (or ignore the instruction of the PDCCH monitoring) after an emergency event. In one example, the emergency event may be a transmission of a PRACH for a link recovery procedure. In one example, the emergency event may be a transmission of a SR for requesting an UL resource. In one example, the SR may be corresponding to a higher priority index (e.g., 1). In one example, the emergency event may be a transmission of a HARQ feedback. In one example, the HARQ feedback is a NACK. In one example, the HARQ feedback may be corresponding to a higher priority index (e.g., 1). In one example, the emergency event may be a transmission of a PUSCH. In one example, the PUSCH may be corresponding to a higher priority index (e.g., 1).

Figure 7:
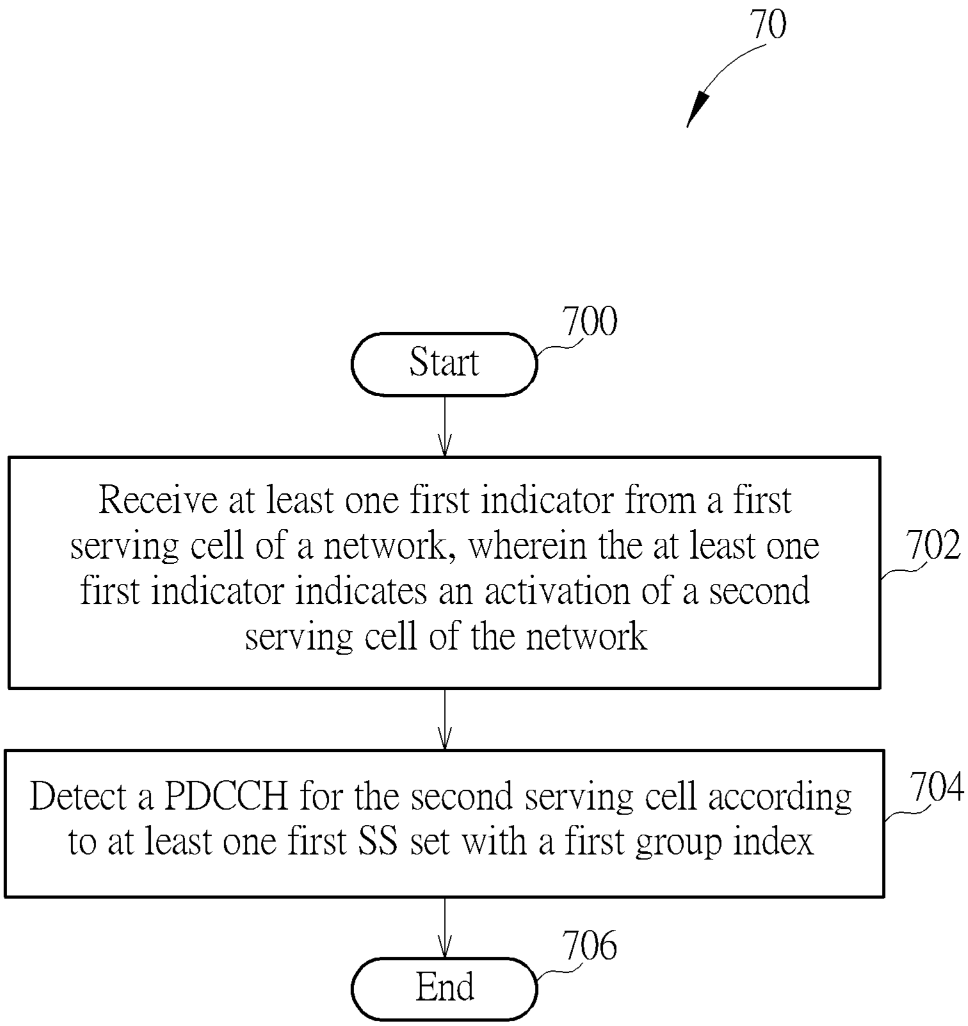
FIG. 7 is a flowchart of a process according to an example of the present invention.

FIG. 7 is a flowchart of a process 70 according to an example of the present invention. The process 70 may be utilized in a communication device, to handle detection of a PDCCH. The process 70 may be compiled into the program codes 214 and includes the following steps:

Step 700: Start.

Step 702: Receive at least one first indicator from a first serving cell of a network, wherein the at least one first indicator indicates an activation of a second serving cell of the network.

Step 704: Detect a PDCCH for the second serving cell according to at least one first SS set with a first group index.

Step 706: End.

According to the process 70, the communication device receives at least one first indicator from a first serving cell of a network, wherein the at least one first indicator indicates an activation of a second serving cell of the network. Then, the communication device detects a PDCCH for the second serving cell according to at least one first SS set with a first group index. That is, the activation of the second serving cell triggers the communication device to detect the PDCCH. Thus, the cell activation/deactivation and the PDCCH monitoring adaptation can be simultaneously operated in the serving cells.

Realization of the process 70 is not limited to the above description. The following examples may be applied for realizing the process 70.

In one example, the first group index is a predetermined value or is configured by the network. The first group index may be utilized to instruct the communication device to receive the PDCCH for the second cell according to the at least one first SS set with the first group index.

In one example, the communication device detects the PDCCH for the second serving cell according to the at least one second indicator in a DCI from the network according to one of the following instructions: detecting the PDCCH for the second serving cell according to the at least one first SS set with the first group index according to the at least one first indicator, detecting the PDCCH for the second serving cell according to at least one second SS set with a second group index according to the at least one indicator, and stopping detecting the PDCCH for the second serving cell according to at least one third SS set for a time period according to the at least one indicator. In one example, the instruction of stopping detecting the PDCCH for the second serving cell according to the at least one third SS set for the time period according to the at least one indicator comprises: detecting the PDCCH for the second serving cell according to the at least one third SS set for the time period according to the at least one indicator if the at least one third SS set is a predetermined SS set, and stopping detecting the PDCCH for the second serving cell according to the at least one third SS set for the time period according to the at least one indicator, if the at least one third SS set is not the predetermined SS set.

The communication device may apply one or more of the following examples to the previous examples (e.g., the process 30, 50 and/or 70), to realize the detection of the PDDCH.

For the process 30 and the related examples, the following example(s) may be applied to the detection of the PDDCH in the second BWP, after changing to the second active BWP.

For the process 50 and the related examples, the following example(s) may be applied to the detection of the PDDCH, before performing the UL transmission, or after receiving a DCI and the DCI is received after performing the UL transmission.

For the process 70 and the related examples, the following example(s) may be applied to the detection of the PDDCH, after receiving the at least one first indicator.

Those skilled in the art can readily modify the terminologies (e.g., SS set, group index, indicator, serving cell) in the examples to combine the examples properly.

The communication device detects (e.g., monitors, receives) a PDCCH for a first serving cell of a network according to (e.g., via) at least one first SS set with a first group index. The communication device receives at least one indicator in a DCI from the network (e.g., after detecting the PDCCH). Then, the communication device detects the PDCCH for the first serving cell of the network according to the at least one indicator, after receiving the DCI, according to one of the following instructions: detecting the PDCCH for the first serving cell according to (e.g., via) the at least one first SS set with the first group index according to the at least one indicator; detecting the PDCCH for the first serving cell according to at least one second SS set with a second group index according to the at least one indicator; and stopping detecting the PDCCH for the first serving cell according to at least one third SS set for a first time period according to the at least one indicator. That is, the communication device continues detecting the PDCCH with the same SS set, changes to detect the PDCCH with a different SS set or stops detecting the PDCCH, according to the received indicator. In other words, the PDCCH may be detected according to various numbers of SS sets. Thus, power consumption of the communication device can be controlled adaptively via the at least one indicator. As a result, the problem of the power consumption is solved.

In one example, the communication device stops detecting the PDCCH for the first serving cell according to at least one fourth SS set with another group index, when detecting the PDCCH for the first serving cell according to the at least one first SS set with the first group index according to the at least one indicator.

In one example, the communication device stops detecting the PDCCH for the first serving cell according to at least one fifth SS set with another group index, when detecting the PDCCH for the first serving cell according to the at least one second SS set with the second group index according to the at least one indicator.

In one example, the first time period is configured by a higher layer signal, or is indicated in the DCI. The DCI may be scrambled by a cell radio network temporary identifier (C-RNTI) or a power saving RNTI (PS-RNTI). The DCI may be received in a UE specific SS (USS) set or a CSS set.

In one example, the first group index is configured by a higher layer signal.

In one example, the communication device determines that a sixth group index of at least one sixth SS set is a default group index, if the at least one sixth SS set is not configured with a group index.

In one example, one of the at least one first SS set is configured with the second group index. That is, a SS set may be configured with two group indices.

In one example, the first group index is determined according to a CORESET Pool Index for a CORESET associated with one of the at least one first SS set.

In one example, the communication device detects the PDCCH for the first serving cell according to a predetermined SS set. The communication device stops detecting the PDCCH for the first serving cell according to the at least one third SS set except the predetermined SS set, when stopping detecting the PDCCH for the first serving cell according to the at least one third SS set for the first time period according to the at least one indicator. That is, the detection of the PDCCH regarding to the predetermined SS set is not affected by the at least one indicator. In one example, the predetermined SS set comprises a CSS set. In one example, the predetermined SS set comprises a USS set with a SS set index.

In one example, the communication device stops detecting the PDCCH for the first serving cell, when stopping detecting the PDCCH for the first serving cell according to the at least one third SS set for the first time period according to the at least one indicator. That is, the detection of all the SS set for the first serving cell may be stopped.

In one example, the communication device detects the PDCCH for the first serving cell according to the at least one second SS set with the second group index according to the at least one indicator, after a second time period after receiving the at least one indicator.

In one example, the communication device stops detecting the PDCCH for the first serving cell for the first time period according to the at least one first SS set with the first group index according to the at least one indicator, after a third time period after receiving the at least one indicator.

In one example, the communication device detects the PDCCH for the first serving cell according to at least one seventh SS set with a default group index, when a timer expires. In one example, the communication device stops detecting the PDCCH for the first serving cell according to at least one eighth SS set with another group index. In one example, a value of the default group index is 0. In one example, a value of the timer is not larger than a value of a bandwidth part (BWP)-inactivity timer for the first serving cell.

In one example, the second group index is associated with an empty SS set. In one example, the communication device stops a BWP-inactivity timer for the first serving cell, when detecting the PDCCH for the first serving cell according to the at least one second SS set with the second group index according to the at least one indicator. In one example, the communication device changes (or switches) an active BWP according to expiration of a BWP-inactivity timer, wherein the active BWP is a default BWP or a dormancy BWP (e.g., configured by the network).

In one example, the communication device stops a BWP-inactivity timer for the first serving cell, when stopping detecting the PDCCH for the first serving cell for the first time period according to the at least one indicator.

In one example, the communication device changes (or switches) an active BWP according to expiration of a BWP-inactivity timer, when stopping detecting the PDCCH for the first serving cell according to the at least one third SS set for the first time period according to the at least one indicator, wherein the active BWP is a default BWP or a dormancy BWP (e.g., configured by the network).

In one example, the at least one first SS set is configured for a BWP of the first serving cell.

In one example, the at least one second SS set is configured for a BWP of the first serving cell.

In one example, the first serving cell is a scheduled cell of a second serving cell configured by the network.

In one example, the communication device detects the PDCCH according to at least one ninth SS set for the second serving cell, wherein at least one identity of the at least one eighth SS set of the second serving cell comprises at least one identity of the at least one first SS set of the first serving cell, when detecting the PDCCH for the first serving cell according to the at least one first SS set with the first group index according to the at least one indicator.

In one example, the communication device stops detecting the PDCCH for the first serving cell according to the at least one first SS set and stopping detecting the PDCCH for the second serving cell according to the at least one eighth SS set, according to the at least one indicator.

In one example, the communication device detects the PDCCH for the second serving cell according to a predetermined SS set. The communication device stops detecting the PDCCH for the second serving cell according to the at least one ninth SS set except the predetermined SS set, when stopping detecting the PDCCH for the second serving cell according to the at least one ninth SS set for a fourth time period according to the at least one indicator.

In one example, the communication device stops detecting the PDCCH for the second serving cell according to the at least one eighth SS set, after a fifth time period after receiving the at least one indicator. Note that the fifth time period and the third time period may be the same.

In one example, the at least one indicator indicates detecting the PDCCH for the first serving cell. In one example, the at least one indicator indicates detecting the PDCCH for a plurality of serving cells comprising the first serving cell.

The operation of "determine" described above may be replaced by the operation of "compute", "calculate", "obtain", "generate", "output, "use", "choose/select", "decide" or "is configured to". The operation of "detect" described above may be replaced by the operation of "monitor", "receive", "sense" or "obtain". The phrase of "according to" described above may be replaced by "in response to". The phrase of "associated with" described above may be replaced by "of" or "corresponding to". The term of "via" described above may be replaced by "on", "in" or "at".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device for handling power consumption. A SS set index, a group index and an indicator are jointly considered for controlling detection of a PDCCH. Thus, the PDCCH may be detected according to various numbers of SS sets. As a result, the power consumption of the communication device can be controlled adaptively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a physical downlink (DL) control channel (PDCCH) reception, comprising:

at least one storage device; and at least one processing circuit, coupled to the at least one storage device, wherein the at least one storage device stores instructions, and the at least one processing circuit is configured to execute the instructions of:

configuring the communication device to receive a downlink (DL) control information (DCI) from a network;

detecting a PDCCH for a serving cell of the network, before changing from a first active bandwidth part (BWP) of the serving cell of the network to a second active BWP of the serving cell;

stopping detecting the PDCCH for the serving cell for a time period according to at least one PDCCH detection indicator comprised in the DCI, before changing from the first active BWP of the serving cell of the network to the second active BWP of the serving cell;

changing from the first active BWP of the serving cell of the network to the second active BWP of the serving cell by an expiration of a BWP-inactivity timer of the communication device; and determining whether to detect the PDCCH according to a plurality of search space (SS) sets for the serving cell, after changing to the second active BWP;

wherein the communication device detects the PDCCH for the serving cell according to the plurality of SS sets, when the plurality of SS sets are configured with a group index and a value of the group index is a predetermined value; and wherein the communication device stops detecting the PDCCH for the serving cell according to the plurality of SS sets for the time period according to the at least one PDCCH detection indicator, when the plurality of SS sets are not predetermined SS sets.

2. The communication device of claim 1, wherein the instruction of stopping detecting the PDCCH for the serving cell according to the plurality of SS sets for the time period according to the at least one PDCCH detection indicator comprises:

detecting the PDCCH for the serving cell according to the plurality of SS sets for the time period according to the at least one PDCCH detection indicator, when the plurality of SS sets comprises a predetermined SS set.

3. The communication device of claim 1, wherein the communication device detects the PDCCH for the serving cell according to the plurality of SS sets, when the plurality of SS sets are configured with the group index indicated before changing to the second active BWP.

4. The communication device of claim 1, wherein the communication device detects the PDCCH for the serving cell according to the plurality of SS sets, when the plurality of SS sets are configured with the group index and the group index is for detecting the PDCCH in the second active BWP.

5. The communication device of claim 1, wherein the second active BWP is a default BWP.

6. The communication device of claim 1, wherein the first active BWP is a dormant BWP, and the second active BWP is a first non-dormant BWP.

7. The communication device of claim 1, wherein the plurality of SS sets are configured with at least one identity.

8. A method performed by a communication device handling a physical downlink (DL) control channel (PDCCH) reception, comprising:

configuring to receive a downlink (DL) control information (DCI) from a network;

detecting a PDCCH for a serving cell of the network, before changing from a first active bandwidth part (BWP) of the serving cell of the network to a second active BWP of the serving cell;

stopping detecting the PDCCH for the serving cell for a time period according to at least one PDCCH detection indicator comprised in the DCI, before changing from the first active BWP of the serving cell of the network to the second active BWP of the serving cell;

changing from the first active BWP of the serving cell of the network to the second active BWP of the serving cell by an expiration of a BWP-inactivity timer of the communication device; and determining whether to detect the PDCCH according to a plurality of search space (SS) sets for the serving cell, after changing to the second active BWP;

wherein the PDCCH for the serving cell is detected according to the plurality of SS sets, when the plurality of SS sets are configured with a group index and a value of the group index is a predetermined value; and wherein the PDCCH for the serving cell is stopped being detected according to the plurality of SS sets for the time period according to the at least one PDCCH detection indicator, when the plurality of SS sets are not predetermined SS sets.

9. The method of claim 8, wherein the step of stopping detecting the PDCCH for the serving cell according to the plurality of SS sets for the time period according to the at least one PDCCH detection indicator comprises:

detecting the PDCCH for the serving cell according to the plurality of SS sets for the time period according to the at least one PDCCH detection indicator, when the plurality of SS sets comprises a predetermined SS set.

10. The method of claim 8, wherein the PDCCH for the serving cell is detected according to the plurality of SS sets, when the plurality of SS sets are configured with the group index indicated before changing to the second active BWP.

11. The method of claim 8, wherein the PDCCH for the serving cell is detected according to the plurality of SS sets, when the plurality of SS sets are configured with the group index and the group index is for detecting the PDCCH in the second active BWP.

12. The method of claim 8, wherein the second active BWP is a default BWP.

13. The method of claim 8, wherein the first active BWP is a dormant BWP, and the second active BWP is a first non-dormant BWP.

14. The method of claim 8, wherein the plurality of SS sets are configured with at least one identity.

* * * * *